United States Patent
Cano et al.

(10) Patent No.: US 11,446,943 B2
(45) Date of Patent: Sep. 20, 2022

(54) ACTING ON THE TEMPERATURE OF A PRINT HEAD DIE

(71) Applicant: HEWLETT-PACKARD DEVELOPMENT COMPANY, L.P., Spring, TX (US)

(72) Inventors: Emilio Carlos Cano, Sant Cugat del Valles (ES); Macia Sole Pons, Sant Cugat del Valles (ES); Jeffrey L Thielman, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/491,822

(22) PCT Filed: Oct. 10, 2017

(86) PCT No.: PCT/US2017/055830
§ 371 (c)(1),
(2) Date: Sep. 6, 2019

(87) PCT Pub. No.: WO2019/074484
PCT Pub. Date: Apr. 18, 2019

(65) Prior Publication Data
US 2021/0138810 A1    May 13, 2021

(51) Int. Cl.
*B41J 29/377*    (2006.01)
*B41J 2/045*    (2006.01)

(52) U.S. Cl.
CPC ........... *B41J 29/377* (2013.01); *B41J 2/0458* (2013.01); *B41J 2/04563* (2013.01); *B41J 2/04581* (2013.01)

(58) Field of Classification Search
CPC .................................................... B41J 2/04563
See application file for complete search history.

(56) References Cited

U.S. PATENT DOCUMENTS

| | | |
|---|---|---|
| 7,040,745 B2 | 5/2006 | Kent |
| 8,814,319 B2 | 8/2014 | Lebron et al. |
| 9,162,453 B2 | 10/2015 | Cruz-Uribe et al. |
| 9,381,739 B2 | 7/2016 | Govyadinov |
| 2005/0179715 A1* | 8/2005 | Merz ............... B41J 2/04581 347/17 |
| 2009/0002408 A1* | 1/2009 | Azami ............. B41J 2/04571 347/17 |

(Continued)

FOREIGN PATENT DOCUMENTS

| | | |
|---|---|---|
| EP | 2993048 A1 | 3/2016 |
| GB | 2542749 | 4/2017 |
| JP | 2009178996 B2 | 8/2009 |

OTHER PUBLICATIONS

Evaluation of the Direct Inkjet Printing Method for the Fabrication of Three-dimensional Ceramic Components, Sep. 24, 2012.

*Primary Examiner* — Shelby L Fidler
(74) *Attorney, Agent, or Firm* — HP Inc. Patent Department (57) ABSTRACT

An example system includes an inlet, a guide structure, a heat exchange device and an outlet. In that example the heat exchange device is in thermal contact with the guide structure to change the temperature of print material. The print material may act on the temperature of a print head die while guided through the print head die.

13 Claims, 10 Drawing Sheets

(56) References Cited

U.S. PATENT DOCUMENTS

| | | | |
|---|---|---|---|
| 2009/0085989 A1* | 4/2009 | Takata | B41J 2/17509 347/85 |
| 2009/0141062 A1* | 6/2009 | Takano | B41J 2/515 347/18 |
| 2011/0242155 A1 | 10/2011 | Bansyo | |
| 2011/0242158 A1* | 10/2011 | Takata | B41J 2/175 347/7 |
| 2012/0105520 A1* | 5/2012 | Shimoda | B41J 2/175 347/6 |
| 2012/0314009 A1* | 12/2012 | Kasahara | B41J 2/18 347/88 |
| 2013/0010027 A1* | 1/2013 | Yamada | B41J 2/17596 347/17 |
| 2013/0127945 A1* | 5/2013 | Vincent | B41J 29/377 347/17 |
| 2013/0201242 A1* | 8/2013 | Yoshida | B41J 2/18 347/17 |
| 2016/0368274 A1 | 12/2016 | Ohtsu et al. | |

* cited by examiner

ACTING ON THE TEMPERATURE OF A PRINT HEAD DIE

BACKGROUND

In 2D and 3D printing technology, print material may be ejected through nozzles mounted on a nozzle plate of a print head die onto a print medium. In some examples the ejection mechanism is based on thermal inkjet or piezoelectric inkjet printing technology. Print material may be ink, toner, a liquid composition, a fluid, a powder based material or grained material. Print material may also comprise binders, e.g. latex, and print material may be supplied in a supply container.

DETAILED DESCRIPTION

In the following, the expression "print material" comprises print materials and build materials for use in 2D or 3D printing technology or printing agents, e.g. binding agents, coalescing agents, fusing agents, etc., used in 2D or 3D printing technology. Print material may be ink, toner, a liquid composition, a fluid, a powder based material or grained material. For example print material comprises at least one of water, glycol, dyes, pigments, and further ingredients. In some examples print material comprises latex or other binders.

In 2D and 3D printing technology print material may be provided from a series of supply containers storing print materials. Print materials may differ in attributes, e.g. color, gloss, binder, material composition, purpose of use in the print process etc., and may be stored in separate supply containers per attribute.

Print material may be guided through a guide structure, e.g. tubes, channels or ink delivery structure, to a print head. In some examples a pump device is implemented to pump the print material from the supply container through the guide structure to the print head. In another example a plurality of pump devices is implemented to pump a plurality of print materials through a guide structure system.

A print head may be fixed at a support structure, e.g. a carriage, wherein the carriage may be mounted over a print area. A carriage may be movable over the print area or fixed, wherein a print area is a print medium, a print substrate or a build platform. A carriage may for example be movable in a dimension over the print area to scan the whole width or length of the print area. A carriage may also be movable in two dimensions to scan the whole width and length of the print area. In an example, a carriage may span the whole width or length of a print area and may be fixed, for example as implemented in a page-wide configuration. In a page-wide configuration a carriage may carry an array of print heads spanning over the whole width or length of a print area or a carriage may carry a single print head with an array of nozzles spanning over the whole width or length of a print area. A carriage may be movable to service stations or other stations outside of the print area and there may exist a series of carriages carrying print heads and possibly other components.

In 2D and 3D printing technology, a print head is to distribute, e.g. via an ejection mechanism through nozzles, print material onto a print area. A print head may comprise a single print head, a plurality of print heads, a print head assembly, a writing system assembly or a writing engine. In some examples a print head comprises inner sub-structures. For example, a print head includes a print head die or pluralities thereof.

In an example, print material may be guided through a print head and may be ejected through a nozzle, or a plurality of nozzles, mounted on a nozzle plate of a print head die onto a print area. In some examples a print head comprises inner delivery structures, e.g. channels, to guide the print material to a series of print head dies. In an example, a print head die comprises print material delivery structures, e.g. channels on a substrate or circuitry, and print material ejection circuitry to eject the print material from the nozzles mounted on the nozzle plate of the print head die. The print head die may be a silicon die and the nozzle plate may be a layer or substrate of the print head die, e.g. a top layer of the print head die. At least one die can be attached to, or embedded in, a support structure, e.g. the print head, whereby the support structure may also include print material channels to deliver the print material to the print head die and its nozzles on the nozzle plate.

In some examples the ejection mechanism of a nozzle is based on thermal inkjet or piezoelectric inkjet printing technology. In some examples different print materials are guided and ejected within a single print head die separately. In other examples, each print head die is configured to eject a single print material whereby multiple print head dies are provided in a single print head to eject multiple different print materials.

In some examples puddles or clusters of print material form on a nozzle plate of a print head die when the print head die ejects print material through nozzles mounted on the nozzle plate. Print material ingredients in the puddle may crust on the nozzle plate of the print head die. The expression "to crust" comprises to crust, to cure, to solidify or to harden.

This effect of crusting of print material ingredients in the puddle on a nozzle plate may, for example, influence the performance and quality of the printing process or can even cause failure of the print head die and for example the print head. In an example, crusted print material ingredients may block nozzles on the nozzle plate. This blocking may cause failure of the ejection mechanism of the nozzles, such as dogging, or influences the quality of the ejected print material, e.g. ejected drops of ink.

Maintenance and cleaning processes of the print head die may be performed to remove crusted print material ingredients on the nozzle plate of the print head die. In some examples a polluted print head die is wiped with a cloth in cleaning or servicing stations. Cleaning and servicing of a print head die may cause damages to the print head die due to mechanical pressure or forces to the print head die.

Reduced crusting of print material ingredients may facilitate cleaning and servicing processes of the print head die and may reduce the cleaning frequency of the print head die. Less frequent cleaning and servicing of a print head die may increase the performance of the print system, e.g. printing speed. Reduced crusting of print material ingredients on a nozzle plate may allow to increase the ejection frequency of the print head die. Further the reliability and quality of the print material ejection mechanism of the print head die can be increased if the crusting of print material on the nozzle plate is reduced.

Formation of crust of print material ingredients is related to print material characteristics, ejection conditions of the print head die, ambient conditions, like the print zone temperature, and other conditions. In some examples latex-based print materials form print material puddles on the nozzle plate of a thermal print head die. The warm nozzle plate may evaporate water ingredients of the print material and the print material puddle may increase in viscosity. In this manner, the latex ingredient of the print material can melt and cure on the warm nozzle plate which may generate crusting, for example.

Viscosity parameters, melting and evaporation conditions of print material may depend on temperature. Hence, a factor in the crusting process of print material ingredients on the nozzle plate is the temperature of the print head die, e.g. the temperature of the nozzle plate. Acting on the temperature of a print head die can reduce or eliminate the effect of crusting of print material ingredients thereon.

In an example a decreased temperature of the print head die reduces or eliminates crusting of latex-based print material ingredients on the nozzle plate. In an example a temperature decrease of six to twelve degrees or stabilization of the temperature of a print head die between 48 and 54 degrees Celsius, or around 52 degrees Celsius may be desired to reduce the likelihood of crusting on the nozzle plate of the print head die below a threshold amount.

A solution to act on the temperature of a print head die, which is convenient and easy to implement to a print system, is desired. The expression "acting on the temperature" comprises decreasing, increasing, stabilizing or maintaining the temperature. The present disclosure describes a system, a method and a computer readable medium with instructions for acting on the temperature of a print head die. In an example, no modifications of the print head die are made, e.g. no modifications to the channels or circuitry of the print head die are implemented. In an example, no modifications of the print head comprising the print head die are made, e.g. no modifications of the inner sub-structure of the print head or no modifications of the print head's housing. Print material having a specific temperature is provided to a print head die and is to act on the temperature of the print head die while the print material is guided through the print head die and ejected subsequently.

Figure 1:
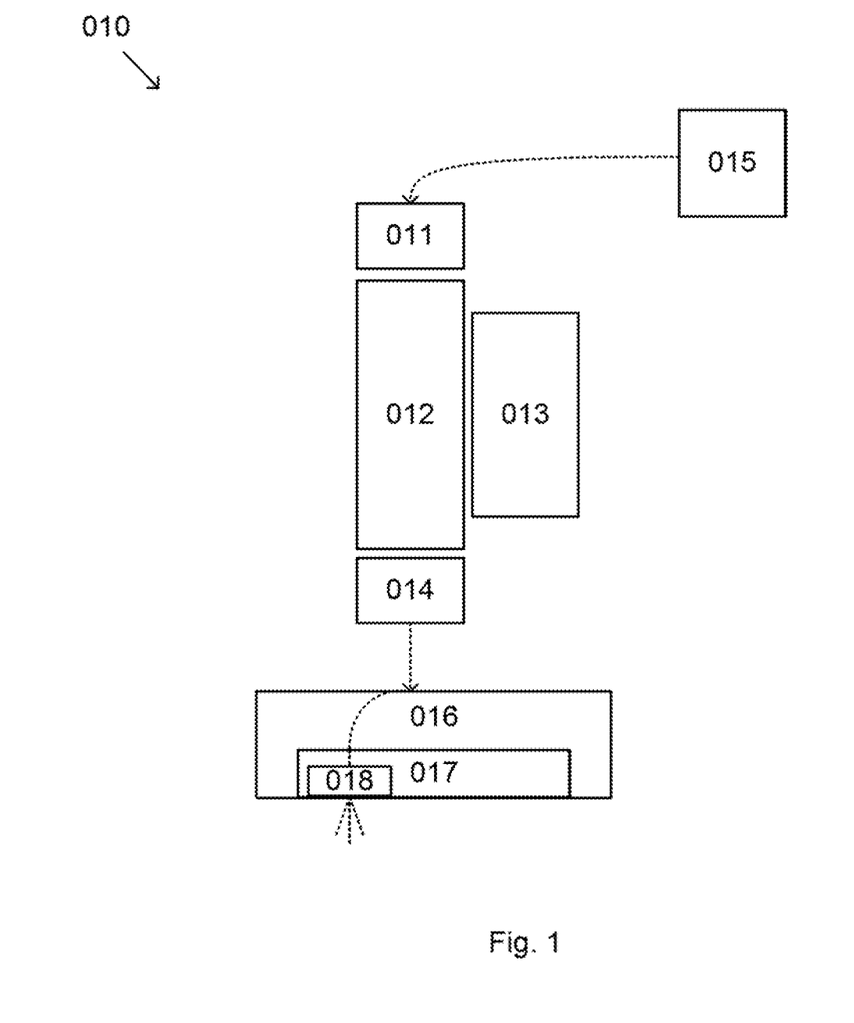
FIG. 1 schematically shows an example of a system to act on the temperature of a print head die.

In an example, schematically shown in FIG. 1, a system (010) comprises an inlet (011), a guide structure (012), a heat exchange device (013) and an outlet (014). The inlet (011) is to provide print material having a first temperature from a supply container (015). The guide structure (012) is coupled to the inlet (011) and is to guide the print material. The guide structure (012) is in thermal contact with the heat exchange device (013). The heat exchange device (013) is to change the temperature of the print material within the guide structure (012) to a second temperature. The outlet (014) is coupled to the guide structure (012) and is to provide the print material to a print head die (016). The print material acts on the temperature of the print head die (016) while the print material is guided through the print head die (016). The print material may be subsequently ejected by a nozzle (018) on a nozzle plate (017) comprised in the print head die (016).

An inlet (011) are means of entry to the guide structure (012). An inlet (011) can be a shaft, a duct, a pipe, a tube, an opening, a hole or a passage to provide print material having a first temperature. The first temperature may be room temperature or temperature of the ambient environment. In an example the first temperature is between 15 and 45 degrees Celsius. Some examples may comprise a delivery structure, e.g. a tubing structure not shown in FIG. 1, from the supply container (015) to the inlet (011) to route print material to the inlet (011).

A guide structure (012) is to control the movement of the print material within a specific route. A guide structure (012) may be a tube, a pipe, a channel, a passage, a canal, a circuit or a sub-structure. The guide structure (012) is coupled to the inlet (011) to provide the print material from the inlet (011) to the guide structure (012). The inlet (011) can be fixed or attachable to the guide structure (012).

A heat exchange device (013) is to transfer heat from or to the print material within the guide structure (012). The heat exchange device (013) is in thermal contact to with the guide structure (012). Thermal contact between the heat exchange device (013) and the guide structure (012) may be via physical contact, e.g. attached to, part of or enclosed in each other. The heat exchange device (013), when in use, changes the temperature of the print material to a second temperature. The second temperature may be different from the first temperature. The heat exchange device (013) may be a cooler or heater to reduce or increase the temperature of the print material guided within the guide structure (012) to a second temperature.

The guide structure (012) may be part of the heat exchange device (013), or vice versa. For example the heat exchange device (013) may enclose the guide structure (012), wherein the guide structure (012) is an inner tube, pipe, channel, circuit, canal or any kind of sub-structure within the heat exchange device (013).

The guide structure (012) can be attachable to or fixed at the heat exchange device (013) in order to have a thermal contact. For example the guide structure (012) can be attachable or fixed at a side of the heat exchange device (013).

Cooling or heating means may be comprised in the heat exchange device (013) to cool or heat portions of the heat exchange device (013). The heat exchange device (013) may effectively transfer heat from the cooled or heated portion of the heat exchange device (013) to the print material, or vice versa, and thereby changing the temperature of the print material to a second temperature.

An outlet (014) is to provide the print material to a print head die. An outlet (014) can be a shaft, a duct, a pipe, a tube, an opening, a hole, a chamber or a passage to provide print material. The guide structure (012) is coupled to the outlet (014) to provide the print material from the guide structure to the outlet (014). The outlet (014) may be attachable or fixed to the guide structure (012). An outlet (014) may differ in design to an inlet (011) or may have the same design.

An outlet (014) is to provide the print material to a print head die (016). The print material acts on the temperature of the print head die (016) based on the second temperature and while the print material is guided through the print head die (016). The print material may be subsequently ejected by a nozzle (018) mounted on a nozzle plate (017) of the print head die (016).

The print material is in thermal contact with the print head die (016) while guided through the print head die (016) and heat may be transferred between the print head die (016) and the print material. The print material may act as a coolant on the print head die (016) based on the second temperature and while guided through the print head die (016) to reduce the temperature of the print head die (016). The print material may be heating the print head die (016) while guided through the print head die (016) to increase the temperature of the print head die (016). The print material may be in thermal equilibrium with the print head die (016) to stabilize or maintain the temperature of the print head die (016). In some examples the print material may keep the temperature of the print head die (016) constant within a specific temperature range after the print head die (016) has been cooled.

In an example a print head die (016) comprises a nozzle plate (017) and the nozzle plate (017) comprises a series of nozzles for ejecting print material. The nozzle plate (017) is in thermal contact with the print material while the print material is guided through the print head die (016) and is ejected by a nozzle (018) on the nozzle plate (017). Consequently, the print material acts on the temperature of the nozzle plate (017).

For example in inkjet printing technology print material is guided through channels or an inner circuit of a print head die (016) to a series of firing chambers. Within the firing chambers print material forms an expanding bubble triggered by, for example, a thermal resistor or piezoelectric means, and a series of drops of print material may be ejected through a nozzle (018) on the nozzle plate (017). The firing process may produce heat and the nozzle plate (017) may heat up. Puddles of print material may form on the hot nozzle plate (017) and print material Ingredients can crust on the nozzle plate (017).

The print material provided from the outlet (014) may act as a coolant based on the second temperature to reduce the temperature of the nozzle plate (017) while the print material is guided though the print head die (016). After cooling the nozzle plate (017), the print material may stabilize or maintain the temperature of the nozzle plate (017) at a specific range of reduced temperature. The reduced temperature range of the nozzle plate (017) may circumvent or reduce crusting of print material ingredients on top of the nozzle plate (017) below a threshold amount.

In an example the inlet (011) is to receive print material from a supply container (015) having a first temperature between 15 and 45 degrees Celsius, the heat exchange device (013) is to cool the print material guided through the guide structure (012) to a second temperature between zero and 15 degrees Celsius, the provided print material from the outlet (014) to the print head die (016) may act as a coolant on the print head die (016) based on the second temperature and while guided through the print head die (016) and the print material is to be heated, e.g. in a firing chamber of the print head die (016), to a third temperature larger than 45 degrees Celsius in order to be ejected through a nozzle (018), e.g. via thermal inkjet technology.

Figure 2:
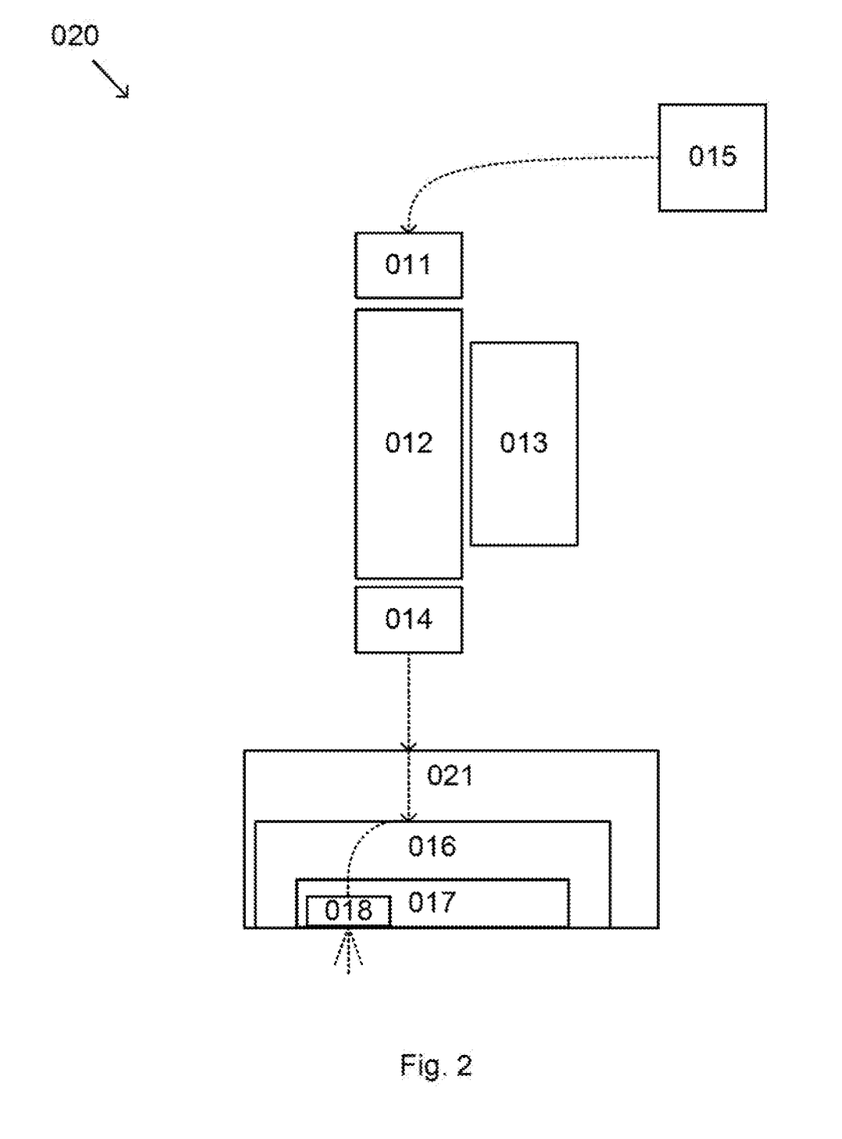
FIG. 2 schematically shows another example of a system to act on the temperature of a print head die.

In an example, schematically shown in FIG. 2, a system (020) comprises an outlet (014), wherein the outlet (014) is to provide the print material to a print head (021) and the print head (021) comprises the print head die (016). In that example the heat exchange device (013) may be implemented externally of the print head (021). In an example, the outlet (014) in system (020) is to provide the print material having the second temperature to the print head (021). In some examples a delivery structure, e.g. a tube or guide structure not shown in FIG. 2, delivers print material from the outlet (014) to the print head (021) and the print material may be guided through the print head (021) to the print head die (016). The print material provided from the outlet (014) is to act on a temperature of the print head die (016) based on the second temperature and while guided through the print head die (016).

In an example the outlet (014) may provide print material having a second temperature between zero and 15 degree Celsius, or around ten degree Celsius to a print head (021). The print material may be guided through the print head (021) to the print head die (016) and may act as a coolant on the print head die (016) while guided through the print head die (016) and based on the second temperature.

Figure 3:
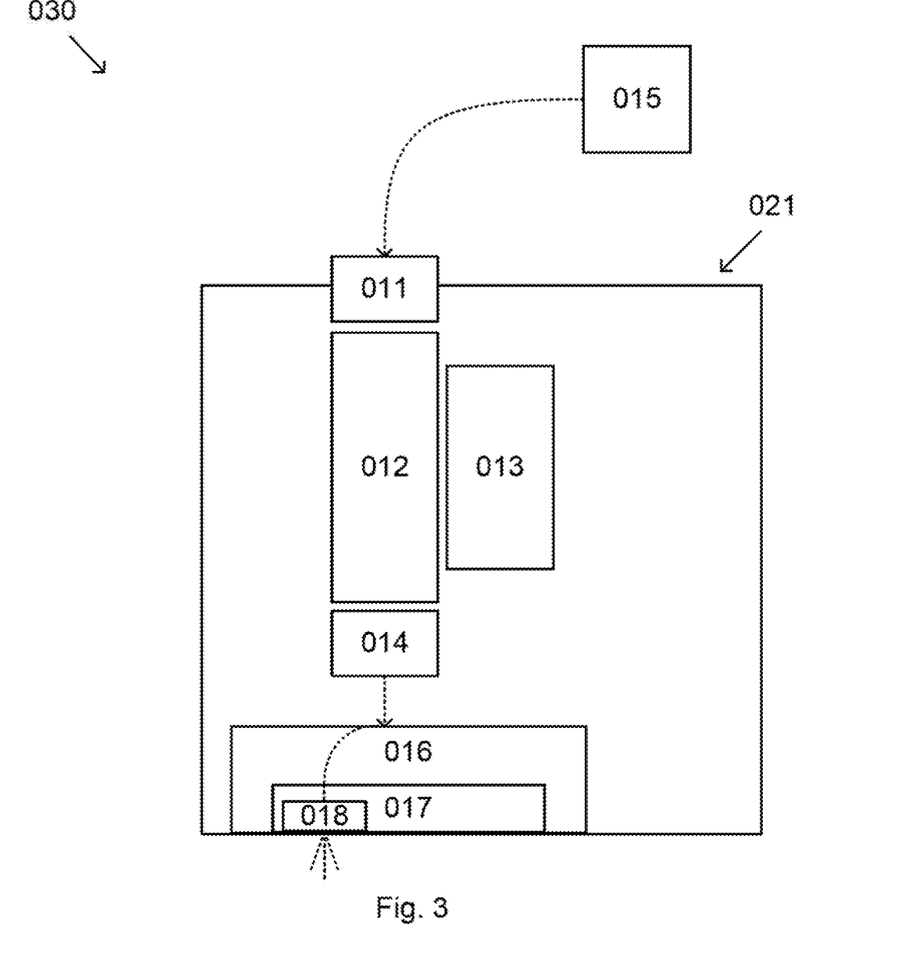
FIG. 3 schematically shows another example of a system to act on the temperature of a print head die.

In some examples at least one of the inlet (011), the guide structure (012), the heat exchange device (013) and the outlet (014) may be enclosed, e.g. partially enclosed, in a print head (021). In an example the heat exchange device (013) may be implemented internally of the print head (021). In an example of a system (030), schematically shown in FIG. 3, the print head (021) comprises the inlet (011), the guide structure (012), the heat exchange device (013) and the outlet (014). The inlet (011), the guide structure (012) and the outlet (014) may be inner print material delivery structure of the print head (021), e.g. inner channels, tubes, openings or sub-structures. The inlet (011) may receive print material having a first temperature from a supply container (015). The guide structure (012) may guide the print material through the print head (021) and the outlet (014) may provide the print material to the print head die (016) within the print head (021). The outlet (014) may be attached to the print head die (016) to deliver the print material to the print head die (016). The heat exchange device (013) may be an inner component of the print head (021) or may be attached in a side of the print head (021), e.g. in the housing structure of the print head (021), and the heat exchange device (013) is to change the temperature of the print material in the guide structure (012) to a second temperature.

Figure 4:
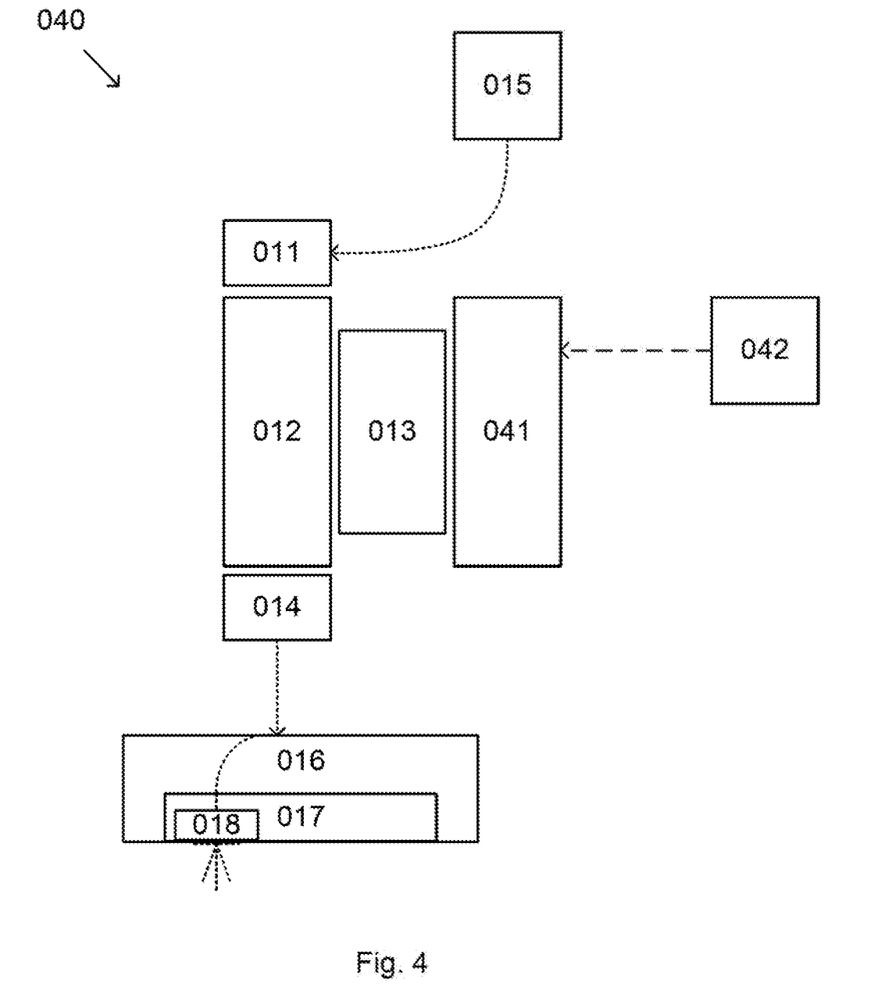
FIG. 4 schematically shows another example of a system to act on the temperature of a print head die.

In another example, schematically shown in FIG. 4, the system (040) to act on the temperature of a print head die (016), comprises a further guide structure (041) to guide a cooling agent and a pump device (042) to pump the cooling agent through the further guide structure (041), wherein the further guide structure (041) is in thermal contact with the heat exchange device (013). The heat exchange device (013) transfers heat from the print material guided within the guide structure (012) to the cooling agent guided within the further guide structure (041), or vice versa.

A further guide structure (041) are means to control the movement of the cooling agent within a specific route. A further guide structure (041) can be a tube, a pipe, a channel, a passage, a canal, a circuit or a sub-structure. The further guide structure (041) may be to provide and guide cooling agent from a cooling agent reservoir, not shown in FIG. 4. The further guide structure (041) can be coupled to the cooling to agent reservoir and the pump device (042), e.g. via tubes, pipes, channels, inlets, outlets or valves.

The further guide structure (041) is in thermal contact with the heat exchange device (013). The further guide structure (041) may be attachable to or fixed at the heat exchange device (013). The further guide structure (041) may be built in or enclosed in the heat exchange device (013). In some examples, the further guide structure (041) may enclose the guide structure (012) or vice versa.

The pump device (042) is to pump the cooling agent through the further guide structure (041) and may keep a flow of cooling agent through the further guide structure (041). The pump device (042) may be a series of pump devices. The pump device (042) may be an impulse pump, a velocity pump or a gravity pump. The pump device (042) may be coupled to the further guide structure (041), e.g. via tubes, pipes, channels, valves or inlets and outlets.

The cooling agent may be a fluid, a powder based cooling agent or a gaseous cooling agent. The cooling agent may be a heat transfer fluid. The cooling agent may comprise at least one of water, additives, e.g. corrosion inhibitors, antifreeze, oil, fuel, and any suitable cooling fluid. The cooling agent may be supplied from a reservoir, not shown in FIG. 4.

The reservoir and pump device (042) may both be located at a side of the print system, wherein the print system may comprise supply containers, print material delivery structures, a print head, a print area and a housing of the print system. The reservoir and pump device (042) may be located on opposite sides of a print system. The reservoir and the pump device (042) may be located at a position where no heat or a reduced amount of heat is transferred to/from the print system. That can be because the print system may comprise radiation sources or curing elements for applying energy to a print area and hence, heat may be transferred to the ambient environment.

The cooling agent may be pumped along the same route to the further guide structure (041) as the print material is guided from the supply container, not shown in FIG. 4, to the guide structure (012). In an example the cooling agent is routed along the same cable carrier chain as the print material is routed, in e.g. a delivery structure.

Figure 5:
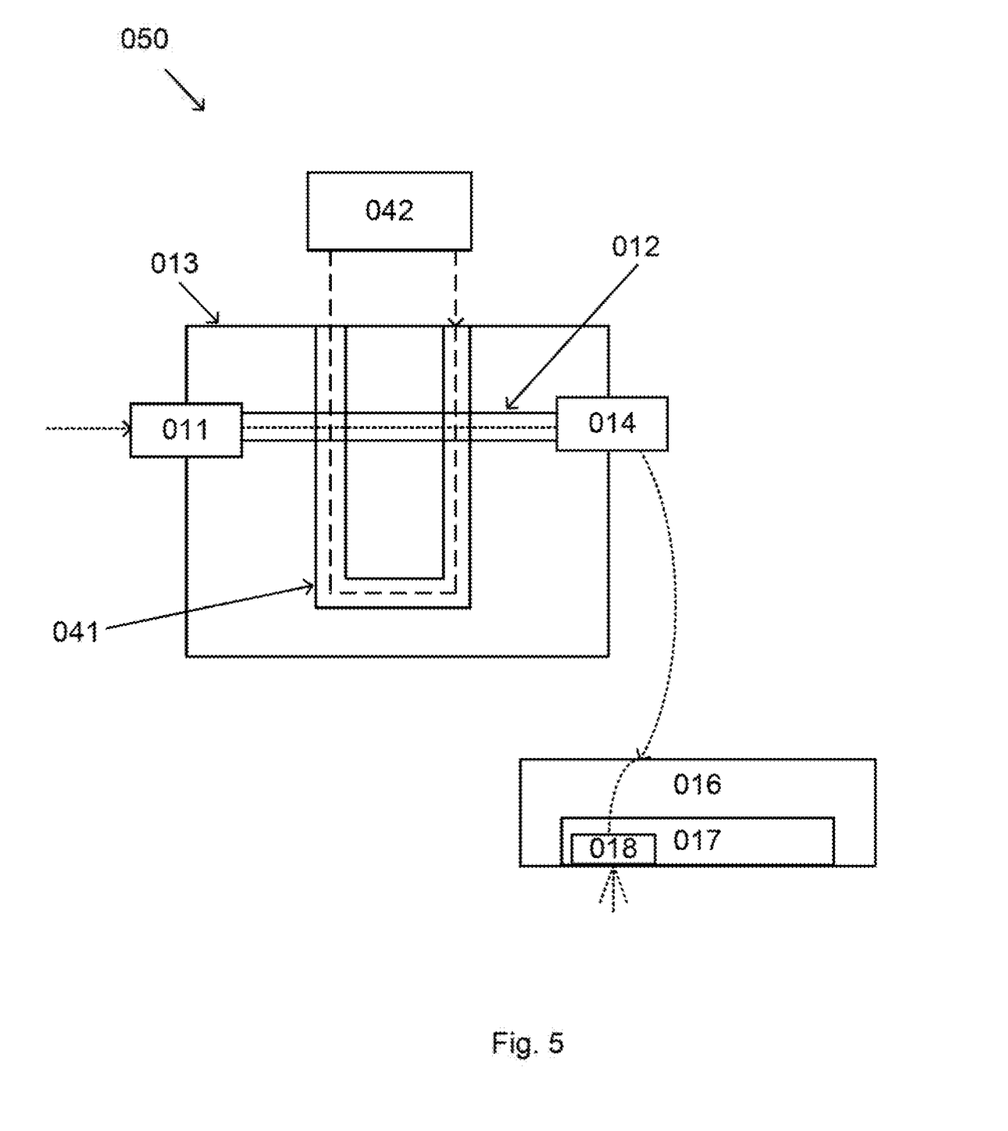
FIG. 5 schematically shows another example of a system to act on the temperature of a print head die.

In another example, schematically shown in FIG. 5, the system (050) to act on the temperature of a print head die (016) comprises a heat exchange device (013), wherein the heat exchange device (013) encloses the guide structure (012) and/or the further guide structure (041). The heat exchange device (013) may be a block or corpus of metal, e.g. aluminum, steel, copper, or another material, e.g. a synthetic material. The heat exchange device (013) may be rectangular, cylindrical or another molded form, the heat exchange device (013) may be hollow or partially hollow, and the heat exchange device (013) may comprise fins or another structure.

For example the guide structure (012) may be enclosed within the heat exchange device (013) to guide the print material through the heat exchange device (013). The guide structure (012) can be a channel, a pipe, a canal, a tube or a circuit within the heat exchange device (013). The guide structure (012) can be routed in various forms through the heat exchange device (013). e.g. zig-zag, straight, curved line, sinuous line, spiral line or an arbitrary line as examples.

In an example an inlet (011) and an outlet (014) are physically attached to the heat exchange device (013) and may be connected to the guide structure (012) to provide print material. The inlet (011) and outlet (014) may be shafts, tubes, passages, ducts, holes or valves of different or the same form.

In an example the further guide structure (041) is enclosed within the heat exchange device (013) to guide the cooling agent through the heat exchange device (013). The further guide structure (041) may be a channel, a pipe, a canal, a tube or a circuit within the heat exchange device (013). The guide structure (041) may be routed in various forms through the heat exchange device (013), e.g. zig-zag, straight, curved line, sinuous line, spiral line or an arbitrary line as examples.

The guide structure (012) to guide the print material and the further guide structure (041) to guide the cooling agent may be routed in parallel through the heat exchange device (013). The guide structure (012) to guide the print material and the further guide structure (041) to guide the cooling agent may be routed in opposite flow directions through the heat exchange device (013). The guide structure (012) to guide the print material and the further guide structure (041) to guide the cooling agent may be routed perpendicular and crossing each other within the heat exchange device (013).

Figure 6:
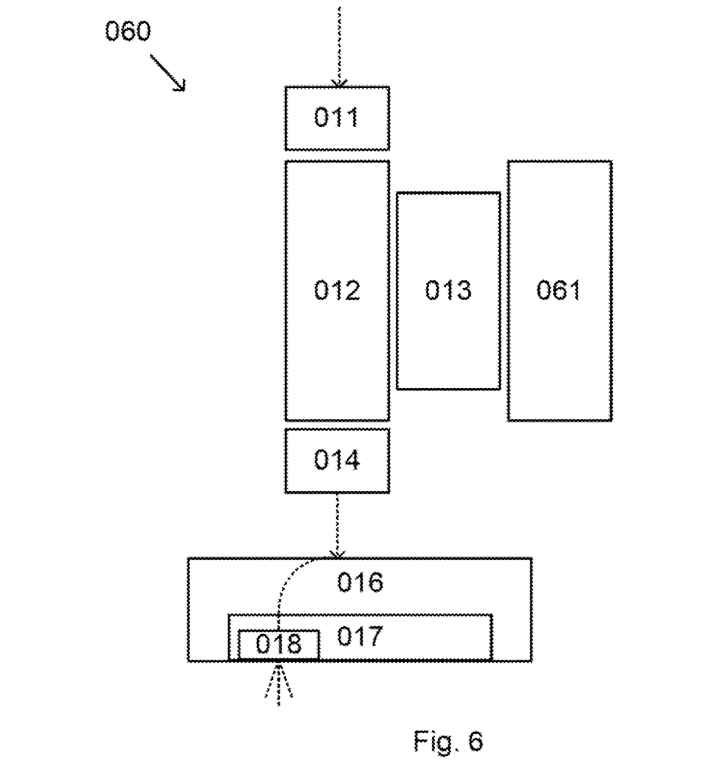
FIG. 6 schematically shows another example of a system to act on the temperature of a print head die.

In another example, schematically shown in FIG. 6, the system (060) to act on the temperature of a print head die (016), further comprises a thermoelectric heat pump (061), wherein the thermoelectric heat pump (061) is in thermal contact with the heat exchange device (013). The thermoelectric heat pump (061) may be a Peltier element to generate a temperature differential between two sides of the Peltier element. The thermoelectric heat pump (061) may act as a cooling or heating device. The heat exchange device (013) transfers heat from the print material guided within the guide structure (012) to the thermoelectric heat pump (061), or vice versa. The heat exchange device (013) changes the temperature of the print material guided through the guide structure (012) to a second temperature.

Figure 7:
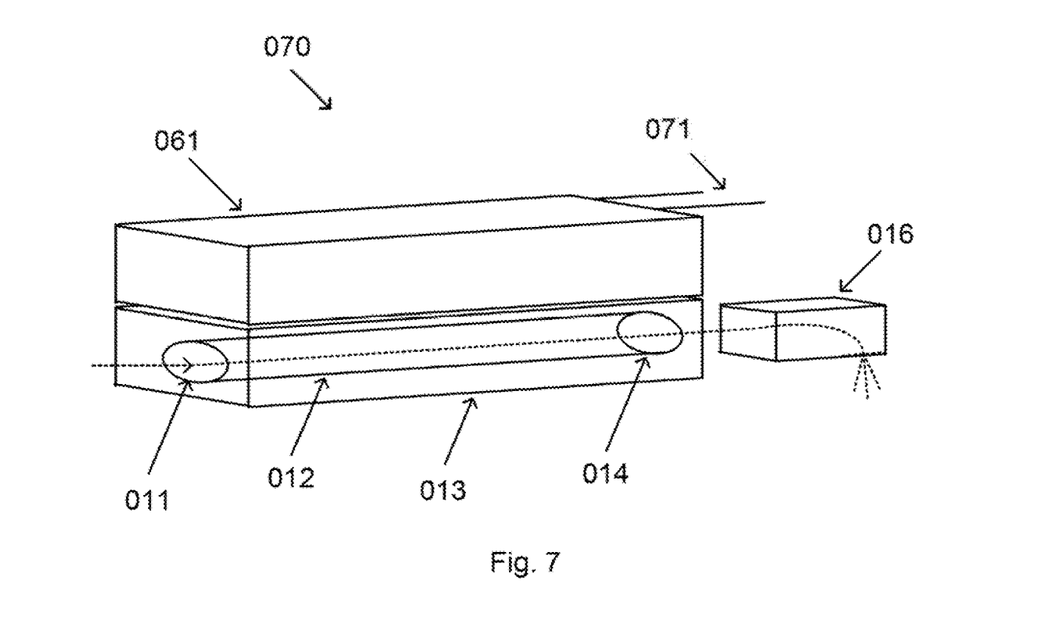
FIG. 7 schematically shows another example of a system to act on the temperature of a print head die.

In another example, schematically shown in FIG. 7, the thermoelectric heat pump (061), e.g. a series of Peltier elements, is physically attached to the heat exchange device (013) in order to have a thermal contact. The heat exchange device (013) may enclose the guide structure (012) to guide the print material and the heat exchange device (013) is to transfer heat from the print material guided within the guide structure (012) to a cooled or heated side of the thermoelectric heat pump (061), or vice versa. The thermoelectric heat pump (061) may comprise electric connectors (071) to connect the thermoelectric heat pump (061) to a power supply. The thermoelectric heat pump may comprise a fan, or any cooling mechanism, not shown in FIG. 7, in order to transport heat away from the thermoelectric heat pump (061) into the ambient environment.

Figure 8:
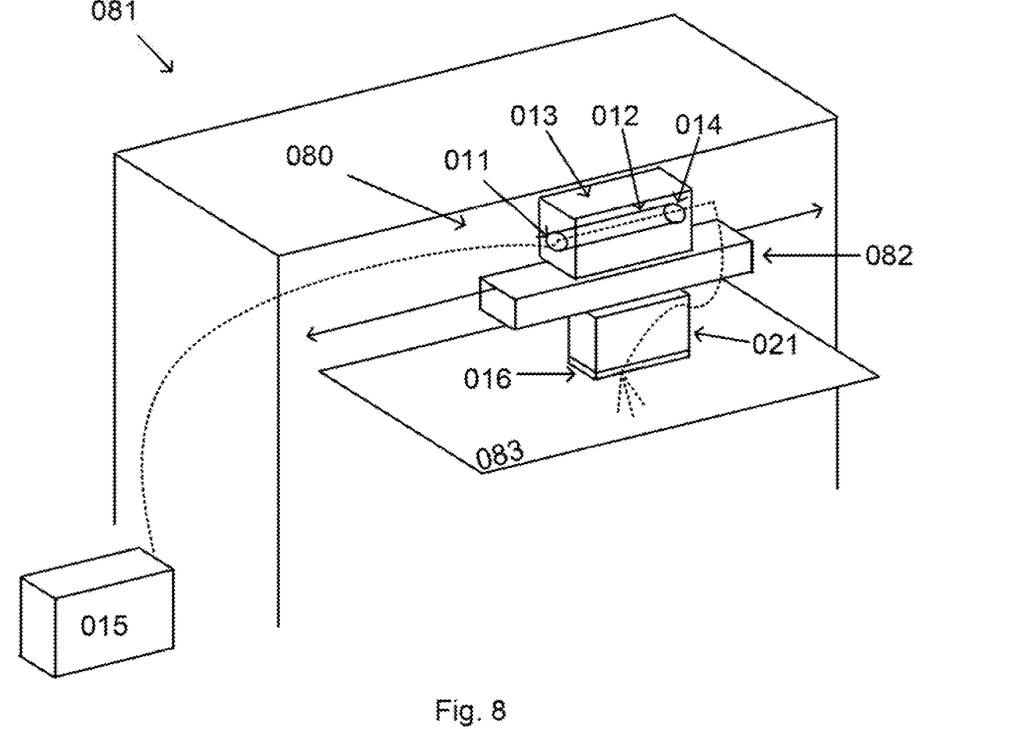
FIG. 8 schematically shows another example of a system to act on the temperature of a print head die.

In another example, schematically shown in FIG. 8, the system (080) to act on the temperature of a print head die (016) is implemented in a print system (081). The print system (081) comprises a carriage (082), for example a single carriage or a plurality of carriages. A carriage (082) may carry a print head (021) or further equipment, e.g. sensors, energy sources, lamps, lasers, etc. A carriage (082) may scan over a print area (083), wherein a carriage (082) may be movable along the width or length of the print area (083), or a carriage (082) may be moveable along both directions over a print area. A carriage (082) may be fixed over the print area (083) and may span the whole width or length of the print area (083) in a so called page-wide configuration. In an example the heat exchange device (013) is fixed at a carriage (082) carrying the print head (021) comprising the print head die (016).

For example, the heat exchange device (013) may be implemented in proximity to the print head (021), wherein the distance from the heat exchange device (013) to the print head (021) may be reduced in order to decrease heat loss or heat gain of the print material provided from the outlet (014)

to the print head (021). That may be because the print system (081) may comprise radiation sources or curing elements for applying energy to a print area (083) and hence, the print system (081) may transfer is heat to the ambient environment.

In an example the heat exchange device (013) is fixed on top of the print head (021), both carried by the carriage (082). In another example the heat exchange device (013) and the print head (021) are besides each other fixed at the carriage (082).

Figure 9:
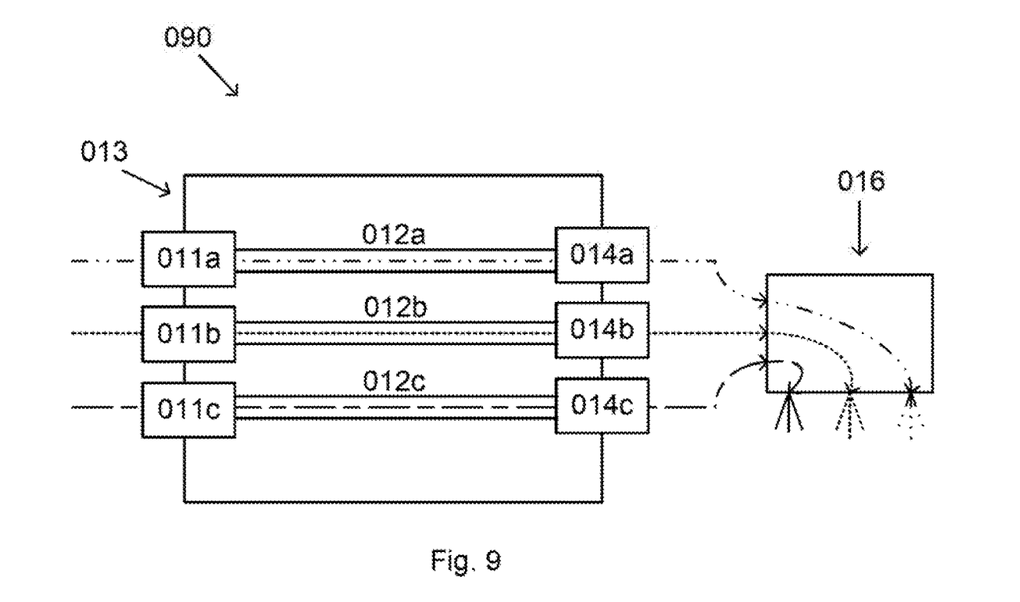
FIG. 9 schematically shows another example of a system to act on the temperature of a print head die.

In another example, schematically shown in FIG. 9, the system (090) to act on the temperature of a print head die (016) comprises a plurality of guide structures (012a, 012b, 012c) in order to guide a plurality of print materials separately. Print materials are guided separately per attribute. e.g. color, binding agent, material composition, etc. In an example each of the colored printing materials, cyan, yellow, magenta and black, are guided in separate guide structures. In an example a plurality of guide structures (012a, 012b, 012c) are routed in parallel. In an example a plurality of guide structures (012a, 012b, 012c) are crossing each other.

In an example each of the plurality of guide structures (012a, 012b, 012c) are in thermal contact with the heat exchange device (013). Each of the plurality of print materials guided through the plurality of guide structures (012a, 012b, 012c) may change the temperature to a second temperature each. For example all print materials may change the temperature to the same second temperature. Depending on various factors, e.g. the flow velocity per print material, the route of the guide structure per print material, first temperature per print material, etc., each print material may change the temperature to a different second temperature per print material. In an example a plurality of print materials change the temperature to a second temperature and another plurality of print materials change the temperature to a different second temperature (e.g. a third temperature).

In an example the plurality of guide structures (012a, 012b, 012c) are in thermal contact with a plurality of heat exchange devices. Each guide structure may be in thermal contact with a respective heat exchange device and each of the heat exchange devices may transfer a specific amount of heat from/to the respective guide structure and print material guided within the guide structure.

In an example each of the plurality of guide structures (012a, 012b, 012c) is coupled to a corresponding inlet and outlet of a plurality of inlets (011a, 011b, 011c) and outlets (014a, 014b, 014c). Inlets (011a, 011b, 011c) and outlets (014a, 014b, 014c) may differ or may be the same in their technical implementation. In an example an inlet (011) is coupled to a plurality of guide structures (012a, 012b, 012c) and in an example an outlet (014) is coupled to a plurality of guide structures (012a, 012b, 012c).

Figure 10:
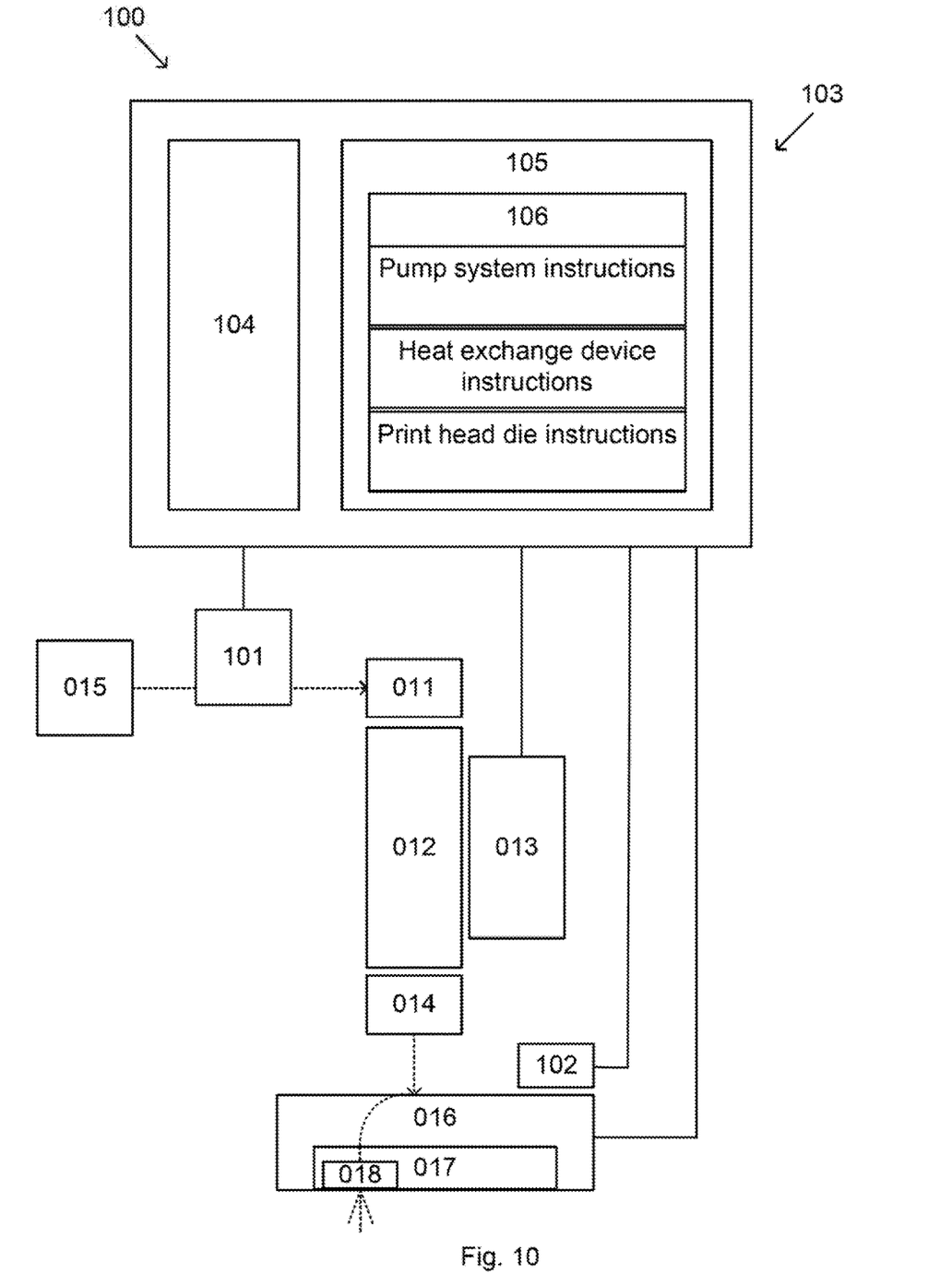
FIG. 10 schematically shows another example of a system to act on the temperature of a print head die.

In another example, schematically shown in FIG. 10, the system (100) to act on the temperature of a print head die (016) further comprises a temperature sensor (102) and a controller (103), wherein a controller comprises circuitry to execute instructions. The temperature sensor (102) senses a temperature value of the print head die (016). The temperature sensor (102) may sense the temperature value of a specific part of the print head die (016), e.g. the nozzle plate (017) or the proximity of the nozzle plate (017). In an example the temperature sensor (102) is comprised in the print head die (016). In an example the temperature sensor (102) is implemented in the print head (021). In another example the temperature sensor is carried by a carriage (082) carrying the print head (021).

A controller (103) comprises a processing system (104), e.g. CPU, and a computer readable storage medium (105) comprising instructions (106). The controller (103) is to control the heat exchange device (013) and the controller (103) may comprise electronics for communicating with and controlling components of the system (100). The computer readable storage medium (105) may comprise volatile, e.g. RAM, and nonvolatile components. e.g. ROM, hard disk, CD-ROM, flash memory, etc. The instructions (106) comprise instructions executable by the processing system (104).

The controller (103) may be comprised in the control system of a print system (081), wherein the control system of the print system (081) is a controller to control print functions, e.g. print processes, calibration steps, post-processing steps, carriage movement, curing devices, print head functions, etc. The controller (103) may be comprised in a distributed network system or can be a microcontroller. In an example the is instructions (106) are a firmware update and the storage medium (105) may be a CD-ROM or a flash drive. The instructions (106) on the CD-ROM or flash drive may be executable by the processing system of the print system (081).

In an example a non-transitory computer readable storage medium (105) comprises instructions (106), that when executed by the processing system (104), cause the processing system (104) to control a pump system (101), to control a heat exchange device (013) and to control a print head die (016). The processing system (104) controls a pump system (101) to provide print material having a first temperature from a supply container (015). The pump system (101) may comprise an impulse pump, a velocity pump, a gravity pump, or a series of pumps. The pump system (101) may be coupled to an inlet (011), e.g. via tubes, pipes, channels, valves or inlets and outlets. The processing system (104) controls the pump system (101) to guide the print material though a guide structure (012). The processing system (104) may control the heat exchange device (013) to change the temperature of the print material within the guide structure (012) to a second temperature. In an example the processing system (104) controls the heat exchange device (013) to cool the print material down, e.g. to a specific temperature range. The processing system (104) controls the pump system (101) to guide the print material through the guide structure (012) and to provide the print material to a print head die (016). In an example the processing system (104) controls the pump device (101) to guide the print material through the sub-structure or circuitry of a print head (021) to a print head die (016). The processing system (104) may control the print head die (016) to eject the print material guided through the print head die (016). The print material may be ejected through a nozzle (018) onto a print area (083) within a print job or the print material may be ejected in service stations comprised in the print system (081). The print material guided through the print head die (016) is to act on the temperature of the print head die (016). In an example the print material acts as a coolant to reduce the temperature of the print head die (016).

In an example a non-transitory computer readable storage medium (105) comprises instructions (106), that when executed by the processing system (104), cause the processing system (104) to obtain temperature data of the print head die (016) and to control the heat exchange device (013) in a closed loop strategy based on the obtained temperature data. The controller (103) may be in communication with a temperature sensor (102) and obtains temperature data of the print head die (016), e.g. temperature data of the nozzle plate (017). The processing system (104) controls the heat exchange device (013) to increase the heat transfer, decrease the heat transfer or maintain the heat transfer from the heat exchange device (013) to the print material guided within the guide structure (012). In an example a closed loop strategy based on the obtained temperature data controls the heat exchange device (013) in order to change the temperature of the guided print material to a second temperature, wherein the second temperature may be defined within a temperature range and based on the second temperature the print material guided through the print head die (016) is to act on the temperature of the print head die (016).

In an example the controller (103) controls the heat exchange device (013) in an open loop strategy, wherein the instructions to control the heat exchange device (013) are without regard to feedback data, e.g. temperature data. The controller (103) may control the heat exchange device (013) based on an empirical method. For example the controller (103) controls the heat exchange device (013) based on best-practice data, e.g. from previously sensed temperature data or observation of crusting formation.

In an example the controller (103) controls a pump device (042) to pump cooling agent through a further guide structure (041). The controller (103) may control the pump device (042) to vary or keep a constant flow of cooling agent through the further guide structure (041). In another example the controller controls a thermoelectric heat pump (061). The controller (103) may control the power supply connected to electric connectors (071) of the thermoelectric heat pump (061) to vary or maintain the heat transfer to the print material within the guide structure (012).

Figure 11:
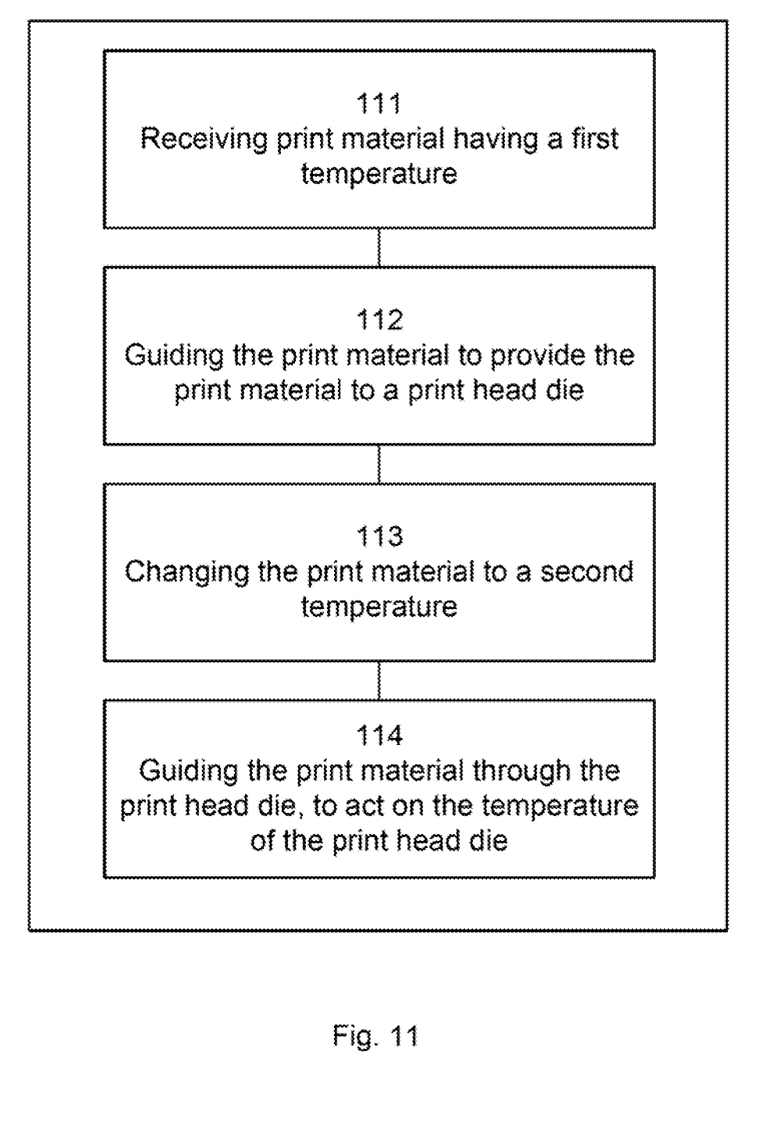
FIG. 11 shows a flow diagram of an example of a method to act on the temperature of a print head.

FIG. 11 shows a flow diagram of an example of a method to act on the temperature of a print head die (016). The method may be implemented as instructions comprised in a computer readable storage medium to be executed by a processing system, such as the processing system (104) and storage medium (105) shown in FIG. 10. In an example of the method, at block (111) print material having a first temperature is received from a supply container (015), at block (112) the print material is guided within a guide structure (012) to provide the print material to a print head die (016), at block (113) the temperature of the print material is changed, e.g. decreased or increased, to a second temperature with a heat exchange device (013) in thermal contact to the guide structure (012), at block (114) the print material is guided through the print head die (016), so that print material, based on the second temperature, is to act on the temperature of the print head die (016) while the print material is guided through the print head die (016) to a nozzle (018). Subsequently, the print material may be ejected through the nozzle (018).

Figure 12:
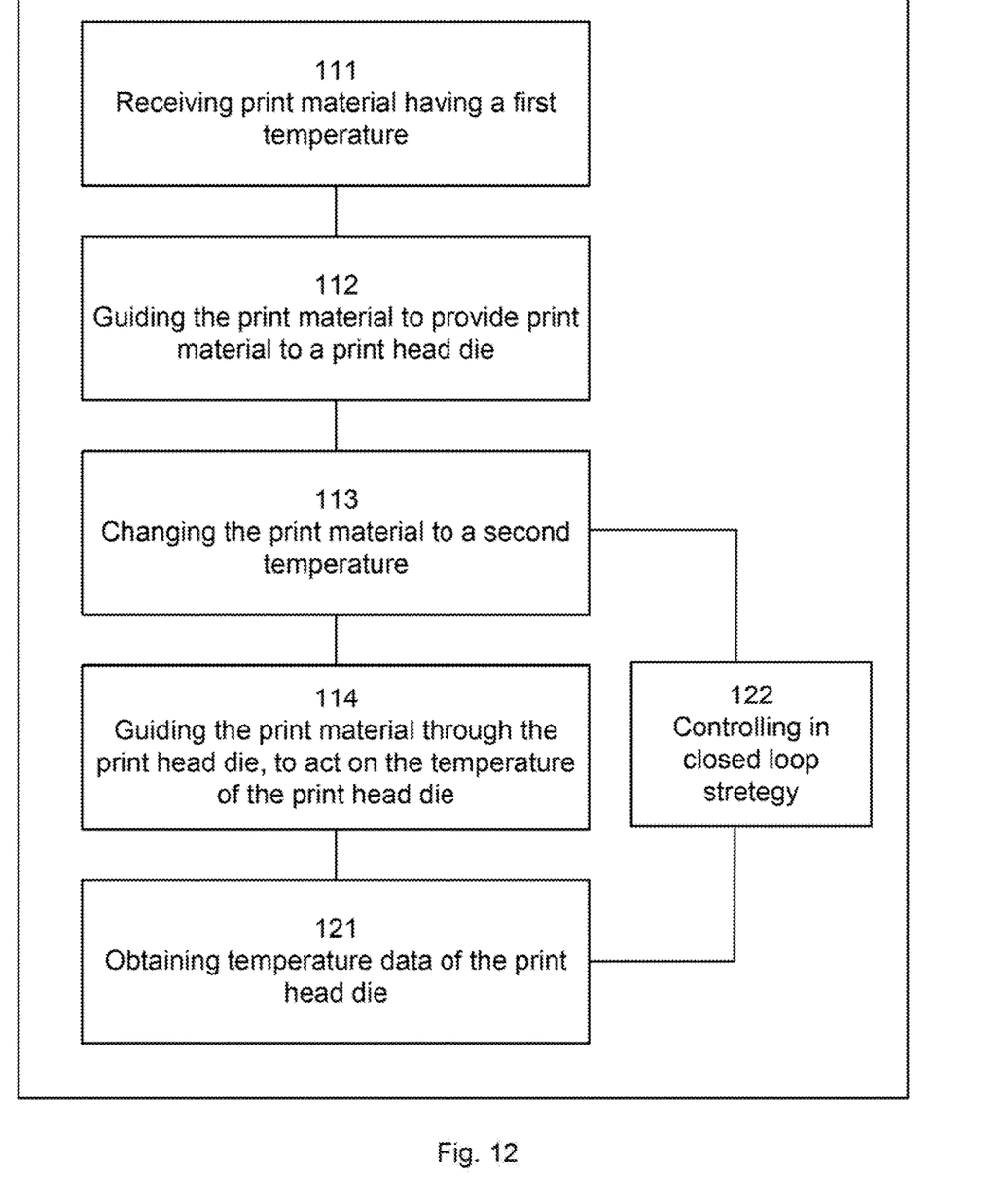
FIG. 12 shows a flow diagram of another example of a method to act on the temperature of a print head.

FIG. 12 shows a flow diagram of another example of a method to act on the temperature of a print head die (016). The method can be implemented as instructions comprised in a computer readable storage medium to be executed by a processing system, such as the processing system (104) and storage medium (105) shown in FIG. 10. In an example of the method, at block (121) temperature data of the print head die (016) is obtained and at block (122) the heat exchange device is controlled in a closed loop strategy based on the obtained temperature data.

The following terminology is understood to mean the following when recited by the description or the claims. The word "comprising" does not exclude the presence of elements other than those listed, the word "including" or "having" does not exclude the presence of elements other than those listed, "a", "an" or "the" does not exclude a plurality and a "series" or "plurality" does not exclude a singularity.

All of the features disclosed in the claims and description (including drawings), and/or all of the elements of any method or process so disclosed, may be combined in any combination and order, except combinations where at least some of such features and/or elements are mutually exclusive.

The invention claimed is:

1. A system comprising:
an inlet to provide a print material having a first temperature from a supply container;
a guide structure coupled to the inlet to guide the print material to a print head die;
a heat exchange device in thermal contact with the guide structure to controllably change temperature of the print material to a second temperature within a defined temperature range, while the print material is in the guide structure; and
an outlet coupled to the guide structure to provide the print material to the print head die,
wherein the print material is to act on a temperature of the print head die based on the second temperature and while guided through the print head die.

2. The system of claim 1,
wherein the outlet is to provide the print material to a print head comprising the print head die.

3. The system of claim 1, further comprising:
a further guide structure to guide a cooling agent; and
a pump device to pump the cooling agent through the further guide structure, wherein the further guide structure is in thermal contact with the heat exchange device.

4. The system of claim 1, further comprising:
a thermoelectric heat pump,
wherein the thermoelectric heat pump is in thermal contact with the heat exchange device.

5. The system of claim 1,
wherein the heat exchange device is fixed at a carriage carrying a print head comprising the print head die.

6. The system of claim 1, comprising:
a plurality of guide structures to guide a plurality of print materials per attribute separately.

7. The system of claim 1, wherein the heat exchange device is in thermal contact with the guide structure to change the print material to a second temperature of zero to 15 degrees Celsius.

8. A system comprising:
an inlet to provide a print material having a first temperature from a supply container;
a guide structure coupled to the inlet to guide the print material to a print head die;
a heat exchange device in thermal contact with the guide structure to change temperature of the print material to a second temperature while the print material is in the guide structure;
a temperature sensor to sense the temperature of the print head die;
a controller to control the heat exchange device; and
an outlet coupled to the guide structure to provide the print material to the print head die,
wherein the print material is to act on a temperature of the print head die based on the second temperature and while guided through the print head die.

9. A method to act on the temperature of a print head die, the method comprising:
- receiving print material having a first temperature;
- guiding the print material in a guide structure to provide the print material to a print head die;
- changing temperature of the print material in the guide structure to a second temperature via a heat exchange device;
- guiding the print material through the print head die, to act on the temperature of the print head die based on the second temperature.

10. The method of claim 9, comprising:
- receiving print material having a first temperature between 15 and 45 degrees Celsius;
- cooling the print material in the guide structure to a second temperature between zero and 15 degrees Celsius so that the print material is to cool a print head die while the print material is guided through the print head die; and
- heating the print material to a third temperature larger than 45 degrees Celsius in order to eject the print material through a nozzle on the nozzle plate of the print head die.

11. The method of claim 9, further comprising:
- providing a cooling agent; and
- pumping the cooling agent through a further guide structure,
- wherein the further guide structure is to cool the print material in the guide structure to the second temperature via the heat exchange device.

12. The method of claim 9,
wherein a thermoelectric heat pump is to cool print material in the guide structure to the second temperature.

13. The method of claim 9,
wherein the heat exchange device to change the temperature of the print material in the guide structure to the second temperature is fixed at a carriage carrying a print head comprising the print head die.

* * * * *